Figure 1:
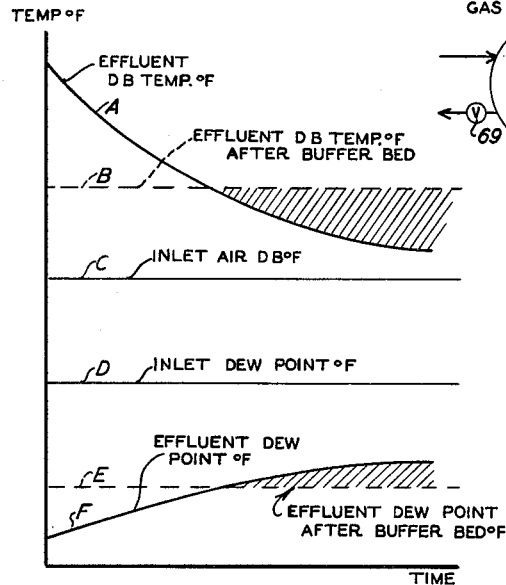

Sept. 7, 1965     G. C. F. ASKER     3,204,388

BUFFER BED DEHUMIDIFICATION

Filed Feb. 1, 1960     2 Sheets-Sheet 1

INVENTOR
GUNNAR C. F. ASKER

BY
ATTORNEY

Sept. 7, 1965  G. C. F. ASKER  3,204,388
BUFFER BED DEHUMIDIFICATION
Filed Feb. 1, 1960  2 Sheets-Sheet 2

INVENTOR
GUNNAR C. F. ASKER

BY
ATTORNEY

United States Patent Office

3,204,388
Patented Sept. 7, 1965

3,204,388
BUFFER BED DEHUMIDIFICATION
Gunnar C. F. Asker, Falls Church, Va., assignor, by mesne assignments, to Atlantic Research Corporation, Fairfax County, Va., a corporation of Virginia
Filed Feb. 1, 1960, Ser. No. 6,587
17 Claims. (Cl. 55—31)

This invention is a continuation-in-part of my parent copending application Ser. No. 645,638, filed March 12, 1957, now abandoned, in which was disclosed adsorption type dehumidification wherein gas is passed through a granular desiccant material to adsorb moisture therefrom to produce a dry gas. As there disclosed, the invention particularly related to the use of a buffer bed comprising granular desiccant to greatly improve the operation of adsorption type dehumidifier by producing a substantially dry or low humidity gas of substantially constant temperature and substantially constant dew point.

As is disclosed in my parent application in usual operation of sorption type dehumidifiers the gas to be dried is passed through a bed of granular desiccant material such as granular silica gel. The bed adsorbs moisture from the gas in a drying portion of the cycle and subsequently, after substantial moisture has been adsorbed and the moisture adsorbing efficiency of the desiccant has been considerably reduced, sometimes up to saturation, the bed is then reactivated in a reactivation cycle by passing a scavenging gas through the bed heated sufficient to cause the bed to give up its adsorbed moisture to the reactivation scavenging gas and the wet gas is then disposed of outside of the system.

That type of gas drying, at the early portion of the drying cycle, when gas to be dried is passed through a freshly regenerated bed having substantial moisture adsorbent capacity, removes substantially all of the moisture from the gas producing a very low dew point gas, but the dried gas leaving the moisture adsorbent bed has substantially increased in temperature by the heat of adsorption of moisture withdrawn by the bed. As the drying cycle continues the desiccant bed becomes less efficient, less moisture is adsorbed and withdrawn from the gas being dried so that its dew point and its corresponding relative humidity is substantially higher than in the initial efficient portion of the drying phase. Moreover, the temperature of the effluent gas, the gas being dried to a lesser degree and less heat of condensation resulting, becomes progressively lower with reduced drying efficiency of the bed. Accordingly, in the extremes of the drying cycle, the effluent dried gas from the bed is first at a relatively high temperature and as the drying cycle continues the temperature is continuously reduced to approximate the temperature of the incoming gas being dehumidified. Correspondingly, the relative humidity of the effluent dried gas at the start of the drying cycle is very low and continuously increases as the bed becomes more and more saturated with moisture adsorbed.

According to the present invention, I have found that if an auxiliary or buffer bed comprising similar granular desiccant material which may be the same as the desiccant used initially to dry the gas in the normal drying operation, is mounted in series with the usual gas drying bed so that the effluent gas following normal dehumidification is passed immediately in series through the auxiliary bed as a buffer, both the temperature and the dew point of the effluent gas remains substantially constant whatever the condition of the initial drying bed may be or whatever the portion of the drying cycle is considered.

The auxiliary buffer bed operates on the principle that after its granular desiccant has reached an equilibrium saturation condition with respect to its moisture content under certain temperature conditions, moisture in such bed will be evolved with passage of gases at relatively raised temperature therethrough; and more moisture will be adsorbed if the temperature of the gas is reduced from the condition at which the equilibrium moisture content was established. The auxiliary or buffer bed of this invention accordingly is operated at an equilibrium saturation condition with respect to its moisture content. It is mounted as an auxiliary or buffer bed through which effluent dehumidified gas, following normal dehumidification in an ordinary desiccant bed in a usual cycle, is passed. But by passing dehumidified gas through the auxiliary buffer bed in its equilibrium moisture content condition, both the temperature and the dew point of the ordinary dehumidified gas becomes stabilized to a substantially constant value.

For instance, the effluent dehumidified gas at the initial more efficient portion of the usual dehumidifying cycle is of low relative humidity and high temperature. When it is then passed through the buffer bed at said saturated equilibrium moisture adsorbing condition it has its temperature reduced to a constant value while the buffer bed is warmed slightly, and the gas may pick up small amounts of moisture from the auxiliary bed in its equilibrium condition. Thus, the moisture content of the buffer bed is slightly reduced and the dew point of the effluent gas becomes slightly raised. As the ordinary drying cycle continues through the usual dehumidification bed the drying becomes less efficient. The dew point of the gas progressively becomes slightly raised and the temperature of the effluent gas is correspondingly lowered. That less efficiently dried gas when passed through the buffering bed then has its moisture further reduced and its temperature raised again. Thus, whether the main drying bed is more or less efficient, the effluent gas leaving the buffer bed is substantially the same in temperature and dew point throughout the cycle.

The auxiliary or buffer bed remains at substantially constant moisture content, slight amounts of moisture being evolved and slight amounts being adsorbed with variations in temperature of the dried gas of the main drying cycle, but the efficient gas from the buffer or auxiliary bed approaches a constant value, both of temperature and dew point. The temperature of effluent gas from the auxiliary bed is, of course, higher than the initial temperature of humid gas to be dried so that the buffering bed stabilizes that temperature of the dried gas at a point above the temperature of the moist inlet air being dried, but that temperature is at an intermediate point well below the maximum temperature at which a fresh dry desiccant bed would raise its effluent gas, but above the minimum temperature at which a substantially exhausted main drying bed would evolve the effluent gas. Consequently the equilibrium condition of the buffer bed is at a raised temperature level, thereby always having substantial capacity to adsorb the moisture from a colder inlet gas. It is this equilibrium condition of the buffer bed and its modifying effect upon the input dehumidified gas passed therethrough, that is intended to be defined by the term as appearing in the claims substantially saturated equilibrium vapor adsorbing condition with respect to adsorbable vaporous components in the gas dried in the main bed.

In a modification, it is found that an auxiliary or buffer bed may substantially improve the operation of a mechanical refrigeration type dehumidifier. Such mechanical type dehumidifier, depending upon the conditions of the air, the heat exchanger, flow rate and temperature differential can vary relatively even more widely in moisture content than the desiccant type dehumidifier. For instance, in the most average condition treating a gas of relatively high or low dew point, that gas passed in heat exchange over cold refrigeration coils will deposit moisture on the coils and, depending upon such variations in operating characteristics, will evolve a dehumidified gas of varying moisture content. According to this modification of the invention variations in the moisture content of the dehumidified gas can be very greatly reduced.

For instance, if the cold evaporator coils are maintained at below the frost point, moisture deposited thereon will freeze, accumulating ice thereon, which reduces the heat exchange and must be removed from time to time by defrosting. During the defrost cycle the coils are heated to melt and even evaporate the ice coated thereon, which evolves large quantities of moisture which is picked up by the gas passed therethrough. A buffer bed used in combination therewith would greatly reduce the quantity of moisture evolved during the relatively short defrost period and thereby stabilize the moisture content of the evolved gas. Again, sometimes at the start of dehumidification the variation in temperature of the evaporator coils can cause a variation in temperature of the gas in contact therewith and consequent variation in moisture content of the gas passed thereover for dehumidification.

Thus a buffer bed tends to stabilize the moisture content of the effluent gas despite variation of influent gas temperature as well as variation of operating conditions of the dehumidifier whereby in heat exchange contact with the refrigerated coils the moisture deposited can vary from a condition from where no moisture is deposited to one where substantial moisture is deposited either in the form of ice or water depending upon both condition of the influent gas as well as the temperature to which it is reduced by the available heat exchange and its inherent dew point.

In an outstanding practical use, the present drying system is applied for dehumidifying closed storage spaces wherein constant gas temperature at a relatively low humidity is of great importance. Particularly in a system where a small positive gas pressure is needed at constant temperature, such as gas balloon storage systems, the dry gas made available at constant temperature solves a difficult problem.

In general, a closed humidity maintenance storage system usually comprises an ordinary desiccant gas drying bed, gas being withdrawn from an enclosed space, passed through the drying bed and returned to the enclosed space at a lower moisture content. In order to maintain the enclosed space under positive gas pressure, from time to time ambient cold humid gas must be passed into the system. Such raw moist gas is necessary only in small quantities and therefore it may be, according to this invention, passed either through the main drying bed or through the buffer bed and then into the storage space from which it is recycled to the ordinary dehumidifier in series with the buffer bed.

The buffer bed is usually used in combination with at least one dehumidifier bed but may be used in combination with duplex dehumidifiers, one of which is being regenerated while the other is used for drying gas, both being in series with the buffer bed for final dew point and temperature adjustment of the usual dried gas.

Figure 2:
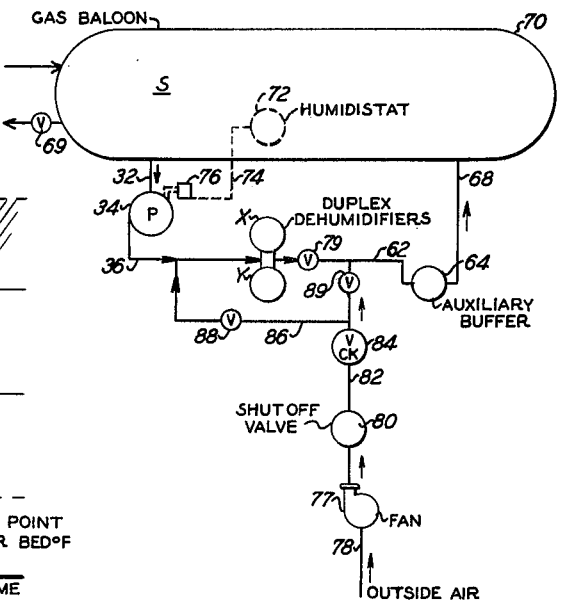
Figure 3:
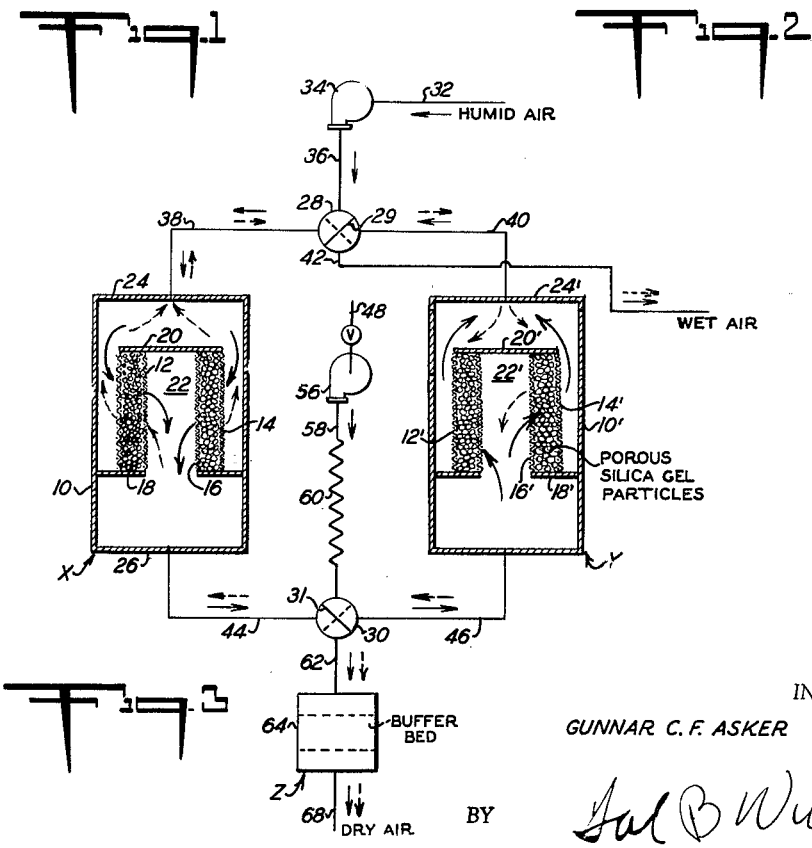
Figure 3:
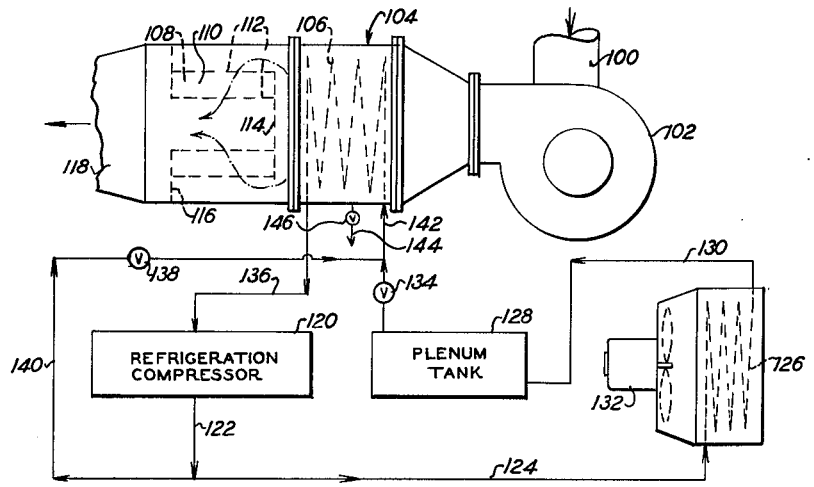
Figure 4:
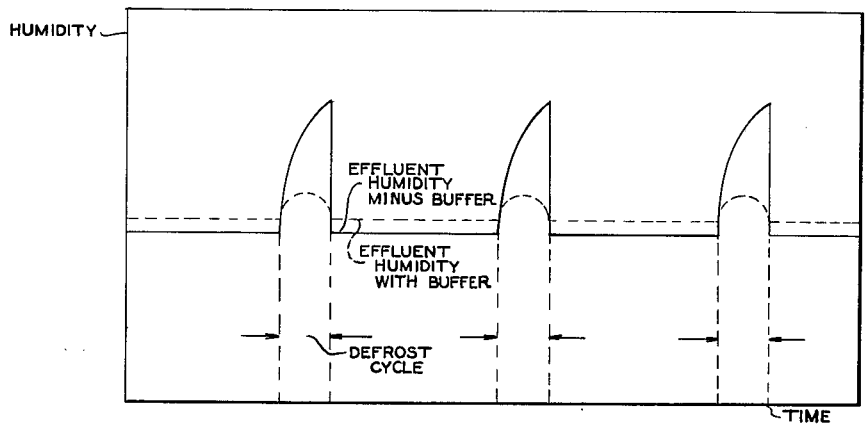

The invention is further explained with reference to the drawings wherein,

FIG. 1 illustrates graphically the improved efficiency of operation available in the present system using a buffer bed, FIG. 2 illustrates diagrammatically the operation of a closed pressurized inflated balloon storage system having a buffer bed, the system allowing additional humid gas to be supplied through the buffer bed for pressurizing, FIG. 3 illustrates a duplex type system wherein one bed is being regenerated while passing the gas to be dried through the combination of the other bed with the buffer bed in series, FIG. 4 shows curves illustrating the condition of the moisture content of a gas varied with periodic defrosting cycles in a refrigeration type dehumidifier system, and the effect of a buffer bed thereon, and FIG. 5 illustrates diagrammatically the combination of a refrigeration type dehumidifier system with a buffer bed.

Referring to FIG. 1, a series of curves are shown illustrating a granular desiccant silica gel bed operating condition with and without a buffer bed, plotting temperature of dried effluent gas as the ordinate against time of operation of the bed on the drying cycle as the abscissa. The curve A illustrated the change of temperature with time measured as the effluent gas temperature at the drying bed outlet. It will be noted that starting with a freshly regenerated bed the temperature is initially high and decreases steadily with time as more and more moisture becomes adsorbed by the bed and the efficiency of the bed to adsorb moisture from the gas becomes steadily reduced. Curve C is a straight line illustrating that the inlet humid air temperature is substantially constant. It will be noted that as the temperature of effluent dried gas becomes continuously reduced by lowering of drying efficiency of the bed, it approaches the temperature of the inlet air as a limit. Curves A and C therefore represents typical conditions with an ordinary gas drying bed with respect to temperature.

The dew point temperature of the gas in ordinary operation is similar but opposite. That is, the dew point, conisdering Curve F, which is the dew point of the effluent gas after passing through the drying bed, starts out low in a fresh highly efficient bed. The dew point increases steadily with time of use of the bed to a maximum, which again would approach the dew point of the inlet gas as the gas drying bed loses its drying efficiency. Curve D as a standard, illustrates the substantially constant dew point of the initial moist gas before drying.

Curves B and E respectively illustrates, as dotted straight lines, the temperature and dew point of the effluent gas after being passed through a buffer bed. While these are shown slightly exaggeratedly as straight lines, they far more nearly approach straight lines than the curves A and F illustrating the respective effect of temperature and dew point in gas which has not been passed through a buffering bed. Thus, considering Curve B at the start of the operation, where high temperature substantially dry gas leaves a fresh drying bed and then passes through the buffer bed, the buffer bed at equilibrium saturated moisture content at an intermediate temperature will lower that gas temperature. It will lower it in any moisture containing condition of the buffer bed by mere heat exchange, since it is a large body, even if it does not remove additional moisture. If the buffer bed is at an equilibrium saturated condition, it will tend to be itself reactivated, giving up moisture whereby the gas becomes cooler. Thus, the gas, after passing through the buffer, is at the lower intermediate temperature of Curve B. The temperature tends to remain at that intermediate temperature because, as the temperature of the effluent gas from the main drying becomes reduced, thereby indicating a higher dew point and lower bed drying efficiency, the moisture removed from the buffer bed becomes more reduced. Hence, at the point where Curve A intersects Curve B, the incoming gas and the buffer bed are at the same temperature and moisture exchanges. As the temperature of the gas of Curve A goes below Curve B, the auxiliary bed begins to adsorb some moisture from the gas passing therethrough and thereby supplies heat to the colder gas. Thus, Curve B is substantially a straight line and illustrates that the temperature of the gas passing through the buffer bed remains substantially constant, even though gas temperature and the efficiency of drying in the main bed is continuously reduced with time.

Considering Curve F, at the start of gas drying operations of a fresh main bed, the dew point of the gas from the main drying bed is at a very low point. The dew point becomes raised to the straight line condition of curve E on passing through the buffering bed. That is, the effluent dry gas from the main drying bed, upon passing through the buffer bed at equilibrium moisture content, will pick up some moisture therefrom, and thereby its dew point will be raised to the condition of Curve E. Where the curves E and F cross after the condition of the main drying bed is reduced in drying efficiency, the dew points are the same; but as the Curve F, with further reduction of main drying bed efficiency, goes above the Curve E, the buffer bed begins to pick up moisture from the colder gas and thereby the buffer bed tends to hold the dew point of the effluent gas leaving the buffering bed at a substantially constant point corresponding to Curve E throughout the varying main drying bed cycle. Thus, as illustrated in FIG. 1, both the temperature, as well as the dew point of the once dried gas, are stabilized by the buffer bed at a substantially constant intermediate value, greatly improving the over-all efficiency of the main gas drying bed in a usual cycle, while producing a gas of constant value most useful for many purposes since the temperature and the dew point are relatively fixed.

As shown in FIG. 3, the duplex drying beds X and Y have a buffer bed Z mounted in series, so that gas, after being dried in either drier X or drier Y, then passes through Z as a buffer bed. The gas drying system, as illustrated in FIG. 3, is adapted to dry gas in the main bed X, while the other bed Y is being regenerated. When the bed Y has been regenerated to efficient moisture adsorbent condition, then gas is passed through the bed Y for drying and the bed X is then regenerated. Whichever bed is on the main drying cycle, the other main bed will simultaneously be regenerated, but the gas will always pass through buffer bed Z. The bed Z achieves an equilibrium moisture content condition and does not need means to regenerate it.

Accordingly, as illustrated in FIG. 3, a main drying unit X, comprises a cylindrical closed tank 10 having a cylindrical bed of granular desiccant material 12 supported between outer cylindrical screen 14 and inner cylindrical screen 16, both screens being porous for retaining the granular desiccant material allowing free passage of gas diametrically therethrough and through the granular desiccant comprising a main drying bed. The lower part of the bed 12 is supported by an imperforate disc shelf 18 which closes the bottom and supports the bed from the cylindrical side walls of the tank 10, having an open center portion 22. The bed 12 is also closed at the top by an imperforate disc 20 extending entirely across the top of the bed including closure of the central cylindrical space 22. The cylindrical drying chamber comprising the tank 10 is closed at the top 24 and bottom 26 by imperforate circular plates, at least one of which is removably fastened (not shown) for servicing of the unit. The drying unit Y of the duplex, as shown, is constructed in exactly the same manner as the unit X, the reference numbers thereto being 10', 12' . . . 22' to show the same construction for like parts.

An upper 4-way rotary vane operated valve 28 and a similar lower 4-way valve 30 are mounted to interconnect both of the units X and Y for gas flow through either periodically according to the desired cycle. The valves 28 and 30 have passage-way control vanes 29 and 31 respectively, to control the sequence of gas flow in a manner explained below for operating both units X and Y.

Humid air from any source to be dried is passed through a duct 32, flow being induced by a blower or fan 34, and passed by way of duct 36 through the multiway valve 28. Valve 28 interconnects both ducts 38 and 40 leading to or from the top of each of the drying units X and Y respectively. Another duct 42 interconnects the valve 28 with an outlet for disposal of wet regenerating gas outside of the system, (when the Y unit is being regenerated) in the full line position as shown for the valve vane 29, the ducts 36 and 38 are interconnected for continuous gas flow through one side of the valve 28, and ducts 40 and 42 are interconnected for continuous gas flow therethrough on the other side of vane 29 of the valve. When the vane 29 of valve 28 is rotated to the dotted line position, then duct 36 and duct 40 will be interconnected for passage of gas to be dehumidified to the Y unit, and ducts 38 and 42 will then be interconnected for waste gas disposal when the X unit is being regenerated.

A duct 44 interconnects the lower valve 30 with the lower outlet side of the bed of the X unit, and a duct 46 interconnects the lower valve 30 with the lower side of the bed of the Y unit.

A duct 48, controlled by a check valve, leads reactivation air from any suitable source to a fan or blower 56 which induces flow of the recycling reactivating gas through a duct 58, which may have an electrical heating unit 60 mounted therein and which heats the gas passed through duct 58 to bed reactivating temperature, passing it to the lower 4-way valve 30. Valve 30 interconnects either unit X by way of duct 44, or unit Y by way of duct 46 with an outlet duct 62, which leads the gas dried in either unit directly to one side of a buffer bed 64 mounted in a buffer unit Z, and, after passing through the bed 64, through a dry air outlet 68.

In the full line position shown of the vane 31 of lower valve 30, the outlet duct 44 of chamber X is interconnected with the outlet duct 62 thereby passing effluent gas from the unit X to the buffer bed 64. The hot regeneration gas duct 58 is simultaneously interconnected with the duct 46 for passage of hot reactivation gas into the lower end of the unit Y. When the vane 31 is reversed to the dotted line position as shown, then the ducts 44 and 58 are interconnected for passing hot regeneration gas in reverse flow into the bottom of unit X, while ducts 46 and 62 are interconnected for passing of dry air from the unit Y to the buffer bed Z.

As shown in FIG. 3, the duplex unit in full line position is set for drying the gas by passage through the bed of unit X while reactivating the bed of unit Y. The manner of operation in the reverse position, that is, passing of gas to be dried through the bed unit Y, while reactivating unit X, is illustrated by the dotted line position of the valves and dotted line direction of the arrows. In operation in the full line position as shown, humid air to be dried enters the systems through duct 32 as impelled or induced by blower 34, passing into duct 38 by way of duct 36 and into the top of drying unit X, passing downward along the outside of the outer bed supporting screen 14, passing diametrically across the bed 12 and into the cylindrical open center portion 22, then downward and out of the unit X into duct 44, then through duct 62 into buffer unit Z, through the buffer bed 64 and finally out through duct 68 as dry buffered gas at a relatively constant temperature and dew point. Simultaneously, while air is passed through unit X for drying, the unit Y is being regenerated. For this purpose, reactivation gas entering the system through line 48 as impelled by blower 56 passes, after heating in heating unit 60, through line 46 and through the bed of unit Y, ultimately passing out through the top 24' by way of duct 40. From the bottom of unit Y, the hot gas passes across the bed 12' first through screen 16' and then out by way of duct 40 and duct 42, being ejected from the system by way of duct 42 to any waste gas disposal area. Hot reactivation air continuously heated by heater 60 and passed by way of duct 46, through the bed 12' will remove all of the moisture from the bed 12' drying the bed to efficient moisture adsorbent condition. The heater 60 will heat the gas to a usual reactivation temperature, such as 300 to 400° F., usually about 350° F. The sequence of gas flow in both units is indicated by the arrows.

At the start of operations with the valve setting as shown in full line position, the gas leaving the freshly regenerated bed 12 in unit X through duct 44, is at a substantially higher temperature than that of the humid inlet gas entering the system at 32 according to the curve A of FIG. 1. However, when passing through the buffer bed 64 at equilibrium moisture content from moisture adsorbed therein at a somewhat lower temperature from the previous cycle, the warm gas will pick up some moisture as it passes through the bed 64 and will lead to duct 68 at a somewhat higher moisture content and dew point than the gas flowing in duct 44 according to curve F. The temperature of the gas in duct 68 is lower than that in duct 44 and the temperature relationship corresponds to the early portion of curves A and B of FIG. 1. As the drying operation continues, the temperature and dew point in duct 44 correspond to the time on curves A and F. The temperature will ultimately become lower and the dew point higher with decreased drying efficiency of main drying bed 12. However, the conditions of the gas in duct 68 will still correspond to curves B and E, even though, after passing the intersection point of curves A and B or E and F, the bed 64 will tend to raise the temperature and adsorb more moisture from gas received through duct 44. Thus, the gas leaving duct 68 is always at substantially constant value.

When the condition of the bed 12 is greatly decreased in efficiency, the cycle is reversed by reversing the valves to the dotted line positions. The flow of gas then follows the dotted line arrows. Gas then is dried in the bed of unit Y while X is being regenerated. Humid air then passing into the system from duct 32 by way of blower 34 and duct 36 passes into the unit Y by way of duct 40 through the drying bed 12', and then out through duct 46 and into buffer bed 64 by way of duct 62. Simultaneously reactivation air enters unit X, first entering through duct 48 as impelled by blower 56 into duct 58, heated by heater 60. It then passes through duct 44 into the lower end of unit X, then passes through bed 12 removing moisture therefrom, and thence passes out through duct 38 which interconnects with wet gas disposal duct 42 for removal of the moisture laden gas from the regenerated bed 12 to a waste gas disposal area.

A further practical operation of this system is illustrated in FIG. 2. The system shown here is applied to dehumidify the gas within a storage space S. The gas in such storage space is desirably maintained at a relatively constant but low dew point and at a relatively constant but low temperature. The system is usually closed to prevent gas exchange with moist outside air, but it also is desirably maintained at a low but substantially constant pressure, hence some additional gas is passed into the system to maintain the storage space under a relatively constant positive pressure so that any gas leakage is outward rather than inward. Particularly this system is also quite useful to dry gas in a storage space comprising a large plastic envelope, such as large polyethylene balloon, to maintain a supply of dry gas for use elsewhere. Such balloon used as a storage chamber for dry gas in under some positive inflation pressure of, for example, one-eighth to three-eights of an inch water column pressure, which is sufficient to maintain a collapsible plastic balloon inflated. The gas drying system described in FIG. 3 is particularly applicable to a system of this type since the dry gas produced is at a constant temperature and intermediate but low constant dew point.

However, for this purpose, the system more generally illustrated in FIG. 3 needs to be modified to dry the small quantity of incoming moist gas to supply a constant pressure to the storage system and to avoid introduction of large quantities of moisture therein. Moreover, the system needs to be modified for intermittent operation since, after reaching a low constant temperature and dew point, the gas from the enclosure needs to be recycled through a drying unit only periodically to maintain the constant condition, adsorbing any excess moisture therefrom that has been introduced either from the introduced fresh gas or from leakage through the porous walls of the chamber as well as imperfect joints or seals.

As indicated above, the auxiliary buffer bed, while at a substantially saturated equilibrium condition always has that condition at a temperature substantially raised from usual ambient temperatures, so that it still has considerable reserve capacity to absorb moisture where the gas passed therethrough is at a lower temperature than the intermediate higher temperature under which the buffer bed normally operates. Accordingly, extraneous gas may be introduced through the buffer bed at ambient temperature lower than the equilibrium temperature of the bed from an outside source, to admit gas as needed to the system to maintain low humidity and the constant pressure on the system.

As shown in FIG. 2, the storage space S is formed as a collapsible balloon of plastic film 70, such as polyethylene or other relatively strong substantially non-porous flexible film forming substances. A humidistat 72 is mounted within the storage space to signal any rise in humidity to a point above a pre-set value to activate the system and withdrew gas from the storage space S, passing it through a dehumidifier and returning it at a lower humidity until the desired value set by the humidistat is achieved, and thereafter the system becomes inactivated as controlled by the humidistat. That dehumidifying system is substantially that shown in FIG. 3 and is operated in similar manner. For purposes of controlling the system, the blower 34 is driven by an electrical motor (not shown) whose source of electrical power in turn is controlled by the humidistat through line 74, operating on that motor to complete its source of current through a switch block 76, which drives the blower 34. The blower 34 passes the gas withdrawn from the chamber S through a line 36 and thence to either of two dehumidifiers from the chamber S through a line 36 and thence to either of two dehumidifiers X and Y, one drying the gas while the other is being regenerated as described in FIG. 3. The effluent gas dehumidified from either unit X or Y is then passed by way of line 62 through the buffer bed 64 which modifies the temperature and dew point of the dehumidified gas as described, returning the conditioned gas to the storage space S by way of line 68.

From time to time, as extraneous gas such as air needs to be introduced for repressuring the system to a positive pressure, as described, or replacing any gas that may have been withdrawn from use elsewhere as dry gas through a line 69, extraneous humid outside air is drawn into the system by fan 77 by way of inlet duct 78, shut-off valve 80 being opened. The inlet repressuring gas is passed through line 82 into line 62 and then through the auxiliary buffer bed 64 which partially dries the gas rising the equilibrium moisture content condition somewhat of the auxiliary bed but not very much, since only a small amount of gas usually needs to be introduced to restore the desired volume or pressure. A check valve 84 is mounted in line 82 to prevent loss of gas through line 82, the inlet gas most desirably passing in line 62 to the auxiliary buffer bed 64.

After the system has been repressured to that desired, if the humidity is higher than set by the humidistat, the system becomes activated by starting the motor of blower 34 and any excess moisture entering the system will be withdrawn in the main dehumidifiers X or Y and the auxiliary buffer bed would soon regain its usual equilibrium condition at the intermediate temperature of the gas according to curve B, as well as the low intermediate dew point according to curve E. Either of units X and Y may be operated to dry gas while the other is being regenerated as described for FIG. 3, as needed.

Sometimes for introduction of large quantities of humid gas to establish a dry gas storage space supply, an auxiliary line 86 may be used with the valve 88 therein open to pass the outside air first directly into the main drying bed X or Y, whichever is on the drying cycle, another valve 89 being mounted in line 82 to divert the flow, and thereby prevent substantial upset of the auxiliary buffer bed equilibrium.

FIG. 5 illustrates a refrigeration type dehumidification system operated with a buffer bed. Air to be dehumidified enters from any source through duct 100 to the suction inlet of a blower or air compressor 102 from which it passes into the shell 104 of the refrigeration dehumidifier. The refrigeration dehumidifier comprises heat exchange (evaporator) coils 106 over which the air to be dehumidified passes in cooling contact to deposit its moisture thereon. The dehumidified air then passes through a buffer bed 108 comprising granular silica gel 110 supported in any suitable manner, here shown as a cylindrical body retained between concentric screens 112. The bed is enclosed at the top by an imperfect ovate plate 114, and at the bottom by a plate 116 which supports and closes the bottom of the cylindrical bed; thus constraining the gas to pass from the outside to the inside of the cylinder in a manner similar to that described for FIG. 3. The dried and buffered gas passes thence outward of the shell 104 in the direction of the arrow as a supply of dehumidified gas of constant moisture content, passing out by way of duct 118.

For supplying the needed refrigeration to evaporator coils 106, a standard refrigeration unit is coupled thereto. That unit comprises a compressor 120 which compresses and passes the warm compressed refrigerant gas in the normal cooling cycle through duct 122 and 124 to condenser coils 126 whenever it is liquified and cooled to ambient temperature. It passes thence to a plenum tank 128 by way of duct 130. A motor driven fan 132 is mounted to blow cooling air over the condenser coils 126 to cool and liquify the refrigerant passing therethrough. The liquid refrigerant is passed by way of line 142 then expanded into the evaporator coils 106, controlled by valve 134, producing the desired cooling effect on the surface of the evaporator coils 106. The refrigerant gas is then recycled to the compressor by way of line 136.

From time to time the evaporator coils 106 are defrosted, this being effected by opening valve 138 allowing warm gas to pass directly from the compresser line 122 by way of line 140, directly to line 142, valve 134 being closed, whereby the warm compressed gas now enters the evaporator coils 106. The warm gas is circulated through the evaporator coils 106 for a short period of time comprising a defrost cycle, sufficient to allow any ice collected on the coils 106 to melt. The water from melting ice dripping to the bottom of the shell 104 can be periodically removed through a drain 144 controlled by a valve 146.

With such normal cycle of operation it will be understood that the air would be dehumidified as its moisture is removed in contact with the cold evaporator coils 106. The dehumidified air then passes through the buffer bed 110 and has its moisture content and temperature slightly raised, but is maintained at a relatively constant value. During the defrost cycle, as the evaporator coil 106 is warmed, the air to be dehumidified has no moisture removed therefrom because it would not be cooled much in contact with the warmed heat exchange surface of the coils. It may even be slightly warmed and its moisture content somewhat increased by passing in contact with the melting ice. Nevertheless, the buffer bed for the short period of the defrost cycle would tend to remove most of the large excess of moisture picked up by the air and thereby produce a still higher but acceptably low moisture content dehumidified air.

The specific effect to control the large moisture excess of such gas is illustrated in the graphical presentation of FIG. 4 in which the humidity of the dehumidified air is plotted against the time, comparing the moisture content of the gas produced in a refrigeration dehumidification system, illustrated in the graph in the full line curve and the moisture content of such system using the buffer bed, illustrated in the dotted line curve.

The curves of FIG. 4, it will be understood, illustrate a somewhat exaggerated condition of moisture content of the dehumidified gas with alternating defrost periods. The normal dehumidification part of the cycle is shown as merely a constant straight line position thus indicating a constant moisture content effluent gas when the dehumidifier is operating normally presumed to be under continuous and constant conditions. From time to time the dehumidifier is interrupted and the cold ice coated evaporator coils 106 are defrosted. In that defrosting phase some, if not all or even more moisture than may have been originally present in the gas to be dehumidified, is returned to the gas in its passage over the wet melting ice surfaces of the cooling coils being defrosted. Accordingly, as the curve shows, the straight full line position is interrupted by large peaks of illustrating much increased moisture content in that gas during the portion of the defrost cycle. The dotted line curve illustrates the corresponding condition of such system where the same refrigeration dehumidifier is operated in conjunction with a buffer bed as shown in FIG. 5.

The dotted line is positioned in normal dehumidification portion of the cycle slightly above the solid line, because under the normal continuous equilibrium moisture absorbent condition of the buffer bed, some moisture will usually tend to be returned to the dehumidified gas by the buffer bed, even as described for FIG. 1. However, during the warmer conditions of defrosting of coil 106 while the effluent gas from the buffer bed also shows slightly increased moisture content, that moisture content is very much decreased below the full line illustrated alternating high peak condition of the effluent gas during normal defrosting in a system which has no buffer bed. Thus, considered only for the single condition of defrosting of a refrigeration type dehumidifier system, the use of the buffer bed much improves the dehumidified quality of the effluent gas, and improves the overall refrigeration thereof.

In normal dehumidification by refrigeration, as indicated above, the moisture content of the dehumidified gas will vary with the variation of the moisture content inlet gas, its temperature and flow rate, and variation of the applied refrigerating conditions. Particularly it would vary with the heat exchange available from the cooling coils which tends to vary with the progressive coating of ice thereon, whereby the heat exchange itself progressively varies. The curve is intended to illustrate only the gas moisture content variation resulting from continuous gas passage with alternating defrosting periods. Hence, for other usual conditions in which there are other variations which affect the moisture content of the effluent gas passed through this type of system, as noted above, the buffer bed also will be useful. For instance in the refrigeration dehumidification the condition of the effluent gas may be much as illustrated in FIG. 1 for the sorption system. Where the buffer bed performs the unusual conditions of protecting the effluent gas during defrosting, a condition is met which is only encountered in the refrigeration dehumidifier system. Thus, the buffer bed is equally and has some conditions even more useful for the refrigeration dehumidifier system, than for the absorption type dehumidifier, because it has the additional advantage in this system of protecting the effluent gas against excessive moisture content even while the unit is being defrosted.

It will be apparent that the refrigeration dehumidifier system would be equally useful for supplying the humidified gas to a closed storage space as illustrated in FIG. 2.

It is also apparent that the buffer bed protected refrigeration dehumidifier, even as the sorption type dehumidifier, may be operated upon gases other than air, and upon gases in various conditions of moisture content, temperature and pressures. For instance, both systems may be operated upon a gas that has been highly compressed and at varied temperatures, and the buffer bed will serve to stabilize the moisture content and temperature of the effluent gas to relatively constant values for both systems.

While of course each system, the sorption type as compared to the refrigeration dehumidification type, has its usual characteristics, the former is most useful for producing extremely low dew points, and the latter, while it is most dependent upon the temperature, since it will not be useful to dehumidify gases at a temperature above the dew point and sometimes below the freezing point of water, has the advantage of being used more economically to handle larger volumes of gas.

The buffer bed of course may be used as indicated herein with either system with different advantages for each. It can also be used where both systems are used in combination. For instance, it may be used in a system wherein the gas to be dehumidified is first passed through a refrigeration type dehumidifier and then through absorption type dehumidifier, the dehumidified gas then finally being passed through a buffer bed whereby large volumes of gas may be very thoroughly dried, most economically. However, the gas to be dehumidified, alternatively may be first passed through a refrigeration dehumidifier, then through a buffer bed and finally through sorption type system whereby an adsorption type system has fed to it a gas of low cold and relatively stable moisture content for improved economy. The latter type of system may also be protected with a second buffer bed whereby a combination of dehumidifiers is produced by passing the effluent gas from the outlet duct following the buffer bed, for instance—of the system illustrated in FIG. 5, as inlet gas to the system described in FIG. 3, whereby both complete systems are combined each having a buffer bed protecting the outlet thereof in continuous gas passage through both systems in a series.

As thus described, an auxiliary buffer bed is used in a system to maintain a substantially constant temperature and humidity greatly improving the efficiency of a usual gas dehumidification system. The buffer bed does not need to be heated or regenerated in any way, but if desired, it is well within the skill of the art to construct the buffer bed in that manner. The desiccant material for the system is usually granular silica gel, but other desiccants such as alumina and other commercial gas drying granular substances may be used. While a heating unit 60 is shown mounted in the gas drying line to heat the gas before entering the bed in FIG. 3, if preferred, heating units may be assembled in or close to each bed for heating the bed rather than the regenerating gas according to construction well known in the art. The dried gas, while shown in FIG. 2 for inflating and storing in a flexible balloon for use as a dry storage source of gas, the system may be used to maintain any fixed volume storage space dried to constant temperature and humidity. While as shown, the system usually operates at low and substantially atmospheric pressures, it, of course, may equally well be operated at substantially high pressures. Moreover, while the gas herein discussed is usually ordinary air, the system may be applied for dehumidification of other gases.

Accordingly, various modifications of the invention will occur by one skilled in the art and it is accordingly intended that the several disclosed apparatus constructions and uses be regarded as illustrative and not limiting, excepted as defined in the claims appended hereto.

I claim:

1. A dry gas storage system comprising a substantially gas tight storage space, a main gas drier comprising a first main bed of granular desiccant material, an auxiliary buffer gas drier comprising a bed of granular desiccant material in substantially saturated equilibrium vapor adsorbing condition with respect to adsorbable vaporous components in the gas dried in the said main bed, means for dynamically withdrawing gas from said gas storage space and passing the same in series first through said first main bed, then through said auxiliary buffer bed and finally returning the dried gas to said storage space, and means for periodically substituting a regenerated main bed for a used main bed before said used main bed becomes fully saturated while said buffer bed remains unregenerated except for gas flow therethrough of dried gas from said main bed, whereby said buffer bed becomes and is then maintained at an essentially saturated equilibrium condition.

2. A dry gas storage system comprising a substantially gas tight storage space, humidistat sensitive to the moisture content of the gas in said storage space, a first main bed of granular desiccant material, an auxiliary buffer comprising a bed of granular desiccant material in substantially saturated equilibrium vapor adsorbing condition with respect to adsorbable vaporous components in the gas dried in the said main bed, means activated by said humidistat for dynamically withdrawing gas from said gas storage space and passing the same in series first through said first main bed, then through said auxiliary buffer bed and periodically substituting a regenerated main bed for a used main bed before said used main bed becomes fully saturated while said buffer bed remains unregenerated except for gas flow therethrough of dried gas from said main beds, whereby said buffer bed becomes and is then maintained at an essentially saturated equilibrium condition.

3. A dry gas storage system comprising a plastic film bag adapted to be inflated with gas for storage thereof, a first main bed of granular desiccant material, an auxiliary buffer bed of granular desiccant material substantially saturated in equilibrium vapor adsorbing condition with respect to adsorbable vaporous components in the gas dried in the said main bed, means for periodically passing extraneous humid gas in series first through said buffer bed to at least partially dry the same and then into said plastic film bed to inflate the same to a small positive gas storage pressure, means for dynamically withdrawing gas from said bag and passing the same in series first through said first main drying bed, then through said auxiliary buffer bed and finally returning the dried gas to said plastic bag, and means for substituting a regenerated main bed for a used main bed before said used main bed becomes fully saturated while said buffer bed remains unregenerated except for gas flow therethrough of dried gas from said main bed, whereby said buffer bed becomes and is then maintained at an essentially saturated equilibrium condition.

4. A dry gas storage system comprising a substantially gas tight storage space, a main gas drier comprising a first main bed of granular desiccant material, an auxiliary buffer gas drier comprising a bed of granular desiccant material in substantially saturated equilibrium vapor adsorbing condition with respect to adsorbable vaporous components in the gas dried in the said main bed, means for passing extraneous humid gas first through said auxiliary buffer bed and then into said storage space to supply a positive gas pressure therein, means for dynamically withdrawing gas from said gas storage space and passing the same in fixed series first through said first main bed, then through said auxiliary buffer bed and finally returning the dried gas to said storage space, and means for substituting a regenerated main bed for a used main bed before said used main bed becomes fully saturated while said buffer bed remains unregenerated except for gas flow therethrough of dried gas from said main bed, whereby said buffer bed becomes and is then maintained at an essentially saturated equilibrium condition.

5. Dry gas storage system as defined in claim 3 wherein a humidistat sensitive to the moisture content of a gas is mounted in said storage space connected to periodically actuate said means for dynamically withdrawing gas from said space.

6. A dry gas storage system comprising a plastic film bag adapted to be inflated with gas for storage thereof, a main duplex gas drier comprising separate main gas drying beds of granular desiccant material with means alternately operative for passing gas to be dried through one main bed with means for simultaneously regenerating the other main bed, an auxiliary buffer bed of granular desiccant material in substantially saturated equilibrium vapor adsorbing condition with respect to adsorbable vaporous components in the gas dried in the said main bed, means for passing extraneous humid gas first through said auxiliary buffer bed and then into said plastic film bag to a small positive pressure therein as initial gas supply thereto, means for dynamically withdrawing gas from said plastic bag and passing the same in series first through one main drying bed of said duplex, then through said auxiliary buffer bed and then finally returning the dried gas to said plastic bag and means for periodically substituting a regenerated main bed for a used main bed before said used main bed becomes fully saturated while said buffer bed remains unregenerated except for gas flow therethrough of dried gas from said main bed, whereby said buffffer bed becomes and is then maintained at an essentially saturated equilibrium condition.

7. Dry gas storage system as defined in claim 6 wherein a humidistat sensitive to the moisture content of the gas in said plastic bag is connected to periodically actuate said means for withdrawing gas from said plastic bag.

8. The method of maintaining the temperature and moisture content of gas continuously passed through a first main granular bed of desiccant material to dry the same substantially constant while moisture adsorbed by said bed and the temperature of the dried gas varies with the length of the bed drying cycle of operation, comprising passing said first main granular bed dried gas continuously and in immediate sequence through a buffer bed of granular desiccant which has reached a substantially saturated moisture adsorbent equilibrium condition, and periodically substituting a regenerated second main bed for the first used main bed before said first used main bed becomes fully saturated while said buffer bed remains unregenerated except for gas flow therethrough of dried gas from said main bed, whereby said buffer bed becomes and is then maintained at an essentially saturated equilibrium condition.

9. The method of drying gas by passing the inlet gas to be dried through granular desiccant material to maintain the temperature and moisture content of the gas substantially constant, comprising passing the gas continuously first through a main bed of granular desiccant material to produce a gas variable in temperature and moisture content as the drying efficiency of the bed decreases, immediately and continuously passing the gas evolved from the main bed through an auxiliary buffer bed of granular desiccant material, and buffer bed periodically substituting a regenerated main bed for a used main bed before said main used bed becomes fully saturated while said buffer bed remains unregenerated except for gas flow therethrough of dried gas from said main beds, whereby said buffer bed becomes and is then maintained at an essentially saturated equilibrium condition.

10. In a gas drying system, a first main gas drier, a buffer bed of granular desiccant material in substantially saturated equilibrium vapor adsorbing condition with respect to the gas dried in the said main gas drier, and means for dynamically passing gas to be dried first through said main gas drier and then through said buffer bed in a fixed series and means for periodically substituting a regenerated main gas drier for said used main gas drier before said used main gas drier becomes fully saturated while said buffer bed remains unregenerated except for gas flow therethrough of dried gas from said main gas drier, whereby said buffer bed becomes and is then maintained at an essentially saturated equilibrium condition.

11. A dry gas storage system comprising a substantially gas tight storage space, a main duplex gas drier comprising separate main gas drying beds of granular desiccant material combined with means alternately operative for passing gas to be dried through one main bed while simultaneously regenerating the other main bed, said last named means including means for directly passing waste regenerating gas outside of said system, an auxiliary buffer bed of granular desiccant material in substantially saturated equilibrium vapor adsorbing condition with respect to the gas dried in said main bed, means for dynamically withdrawing gas from said storage space and passing the same in series first through said one main drying bed of the duplex, then through said auxiliary buffer bed and then finally returning the dried gas to said storage space in fixed series, and for periodically substituting a regenerated main bed for a used main bed before said used main bed becomes fully saturated while said buffer bed remains unregenerated except for gas flow therethrough of dried gas from said main bed, whereby said buffer bed becomes and is then maintained at an essentially saturated equilibrium condition.

12. In a gas drying system, a main duplex gas drier, comprising at least two main gas drying beds of granular desiccant material, means for dynamically passing gas to be dried through at least one bed while simultaneously regenerating the other bed, a buffer bed of granular desiccant material is substantially saturated equilibrium vapor adsorbing condition with respect to the gas dried in the said main bed, and means for dynamically passing gas to be dried first through one of said main gas drying beds and then through said buffer bed in a fixed series and means for periodically substituting a regenerated main gas drier for said used main gas drier before said used main gas drier becomes fully saturated while said buffer bed remains unregenerated except for gas flow therethrough of dried gas from said main gas drier, whereby said buffer bed becomes and is then maintained at an essentially saturated equilibrium condition.

13. A gas drying system comprising the combination of a heat exchanger, a main bed of granular desiccant material, a buffer bed of granular desiccant material in substantially saturated equilibrium vapor adsorbing condition with respect to the gas to be dried in said main bed of granular desiccant material, means for dynamically passing gas to be dried first through said heat exchanger, then through said main bed of granular desiccant material and finally through said buffer bed, means for maintaining the temperature of the heat exchanger surfaces substantially below the dew point temperature of the gas to be dried whereby moisture carried by said gas is deposited on said heat exchanger surfaces at temperatures below the dew point thereof, means for periodically regenerating said main bed of granular desiccant material and substituting another in place thereof before said main bed becomes fully saturated while said buffer bed remains unregenerated except for gas flow therethrough of dried gas from said main bed, whereby said buffer bed becomes and is then maintained at an essentially saturated equilibrium condition, and means for periodically removing the deposited moisture from said heat exchange surface.

14. The apparatus as defined in claim 13 wherein said heat exchanger comprises the evaporator coils of a compressor-expander refrigeration system adapted to reduce the temperature below the freezing point of water whereby ice will tend to form on the heat exchanger surface, said refrigeration system having means for periodically defrosting said heat exchanger surface.

15. The method of dehumidifying a gas comprising first passing said gas in cooling contact with a heat exchanger surface to deposit moisture thereon at temperatures below the dew point of said gas, then passing said gas through a main bed of granular desiccant material to further dry the same, finally passing the gas through an auxiliary buffer bed of granular desiccant material maintained in substantially saturated equilibrium moisture adsorbing condition with respect to said main bed of granular desiccant material, periodically warming said cooling surfaces to remove deposited moisture therefrom and periodically regenerating said main bed of granular desiccant material and substituting another in place thereof, before said main bed becomes fully saturated while said buffer bed remains unregenerated except for gas flow therethrough of dried gas from said main bed, whereby said buffer bed becomes and is then maintained at an essentially saturated equilibrium condition.

16. A dry gas storage system comprising in combination a dry gas storage space, a first main gas drying bed of granular desiccant material and an auxiliary buffer gas drying bed of granular desiccant material, means for dynamically withdrawing gas from said gas storage space and for passing the same in series first through said main gas drying bed and then through said auxiliary buffer bed, and for finally returning the dried gas to said storage space, and means for periodically substituting a regenerated main gas drying bed for the said used main gas drying bed before said used main drying bed becomes fully saturated while said buffer bed remains unregenerated except for gas flow therethrough of dried gas from said main beds, whereby said buffer bed becomes and is then maintained at an essentially saturated equilibrium condition.

17. A gas drying system including a main gas dryer comprising at least two separated main gas drying beds of granular desiccant material, a buffer bed of granular desiccant material, valved duct means alternately interconnecting each main bed with said buffer bed providing flow of gas to be dried first through one or the other of said main beds and then through said buffer bed in series, means for regenerating one of said main beds by passing a hot scavenging gas therethrough and disposing of the moisture laden scavenging gas outside of the system while the other main bed is in gas drying circuit with said buffer bed, and means for periodically substituting a regenerated main bed for a used main bed before said used main bed becomes fully saturated while said buffer bed remains unregenerated except for gas flow therethrough of dried gas from said main bed, whereby said buffer bed becomes and is then maintained at an essentially saturated equilibrium condition.

References Cited by the Examiner

UNITED STATES PATENTS

| | | |
|---|---|---|
| 216,083 | 6/79 | Davy. |
| 1,863,579 | 6/32 | Morse et al. |
| 1,948,779 | 2/34 | Abbott et al. |
| 2,089,776 | 8/37 | Whittman. |
| 2,206,705 | 7/40 | Newman _____ 55—387 X |
| 2,622,414 | 12/42 | Jaubert _____ 62—271 |
| 2,632,315 | 3/53 | Coblentz _____ 62—271 |

REUBEN FRIEDMAN, *Primary Examiner.*

HERBERT L. MARTIN, WALTER BERLOWITZ, *Examiners.*